(12) United States Patent
Buxel et al.

(10) Patent No.: US 6,193,941 B1
(45) Date of Patent: Feb. 27, 2001

(54) PROCESS FOR PRODUCING A METALLURGICAL RAW MATERIAL FROM OIL CONTAINING HEAVY METALS

(75) Inventors: Michael Buxel, Waltrop; Heinz Jochen Keller, Dortmund, both of (DE)

(73) Assignee: Krupp Uhde GmbH, Dortmund (DE)

( * ) Notice: Subject to any disclaimer, the term of this patent is extended or adjusted under 35 U.S.C. 154(b) by 0 days.

(21) Appl. No.: 09/194,662

(22) PCT Filed: May 15, 1997

(86) PCT No.: PCT/EP97/02484

§ 371 Date: Dec. 1, 1998

§ 102(e) Date: Dec. 1, 1998

(87) PCT Pub. No.: WO97/46723

PCT Pub. Date: Dec. 11, 1997

(30) Foreign Application Priority Data

Jun. 1, 1996 (DE) .............................. 196 22 153

(51) Int. Cl.⁷ ............................ C22B 34/20; C01G 31/00
(52) U.S. Cl. .................................. 423/1; 423/62; 423/64; 423/138; 75/420; 75/425; 75/430; 75/622; 75/628; 75/629

(58) Field of Search .................................. 423/1, 62, 64, 423/138; 75/420, 425, 430, 622, 628, 629

(56) References Cited

U.S. PATENT DOCUMENTS

| 3,807,987 | 4/1974 | Peacock . |
|---|---|---|
| 5,427,603 | * 6/1995 | Samant et al. . |
| 5,670,061 | * 9/1997 | Kowallik et al. . |

FOREIGN PATENT DOCUMENTS

| 4309825 | 9/1994 | (DE) . |
|---|---|---|
| 0515950 | 12/1992 | (EP) . |
| 0686598 | 12/1995 | (EP) . |
| 1178267 | 1/1970 | (GB) . |
| 2026458 | 2/1980 | (GB) . |

* cited by examiner

*Primary Examiner*—Steven P. Griffin
*Assistant Examiner*—Christina Ildebrando
(74) *Attorney, Agent, or Firm*—Rosenman & Colin LLP

(57) ABSTRACT

Besides a synthesis gas, a metallurgical raw material is to be produced from an oil containing heavy metals. To do this, the oil is partially oxidized and the heavy metal-containing soot is separated and burnt and the heavy metals thus occurring as ash can be taken to further processing, e.g. washing from the synthesis gas produced, using an aqueous washing solution.

3 Claims, 1 Drawing Sheet

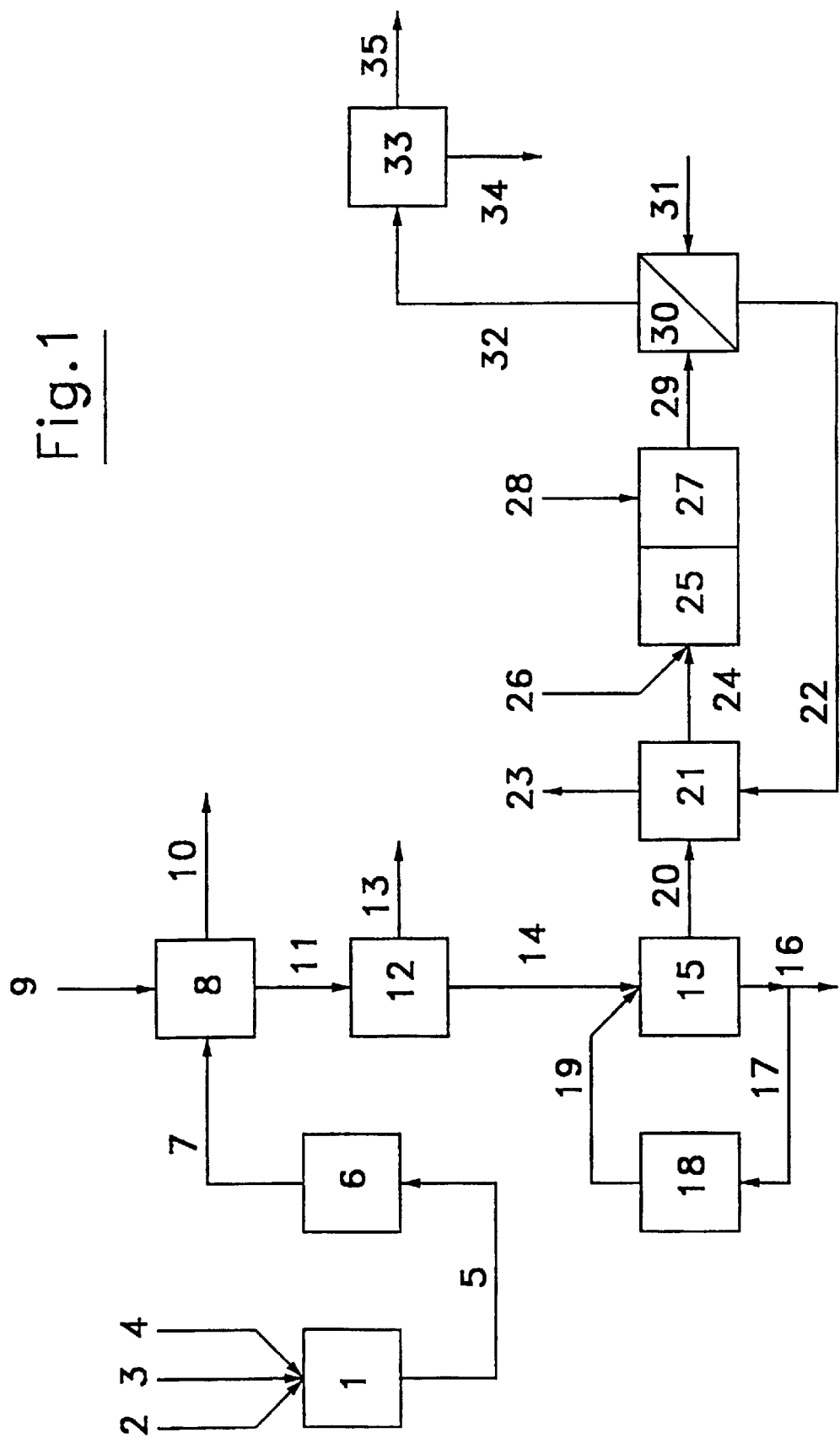

PROCESS FOR PRODUCING A METALLURGICAL RAW MATERIAL FROM OIL CONTAINING HEAVY METALS

The invention relates to a process by which, from a heavy-metal containing oil, in addition to synthesis gas, a metallurgical raw material is generated.

It is known that oils can be contaminated with heavy metals. This applies in principle to all petroleums, whose quality, in addition, is becoming increasingly poorer as resources decrease, particularly to those from Venezuela and Russia, but also to refinery residues, bitumen, waste oils and pyrolysis oils. The heavy metals vanadium and nickel occur particularly frequently as contaminants. In the energetic or material conversion of such oils, the heavy metal content leads to problems: firstly, during combustion or a partial oxidation, heavy metal compounds are formed which develop extremely corrosive actions and, at the prevailing working temperatures, can become molten or pasty, and as a result of which have a tendency to cake, subsequently leading to breakdowns. Secondly, these heavy metal compounds may be emitted only in very low amounts in the gaseous or liquid state. Land filling in solid form is expensive and is subject to strict legal provisions. For these reasons, plant operators preferentially have recourse to oils having low heavy metal contents, which decreases the value of heavy-metal-containing oils.

The present invention solves the problems described by the features of claim 1 covering a process for generating metallurgical raw material from heavy metal containing oil comprising:

(a) separating off and burning the heavy metal containing soot, wherein the heavy metals is produced as ash;

(b) scrubbing out from the resulting synthesis gas by means of an aqueous scrubbing solution the soot formed in the partial oxidation which comprises the heavy metals in adsorbed chemical compounds;

(c) filtering the scrubbing solution in a chamber filter press in such a manner that the filtrate obtained initially is collected and filtered again;

(d) producing the filtercake which comprises virtually all the heavy metals and dried it to a residual moisture of less than 10% in a spray dryer, a pneumatic dryer or a mill drier by heated inert gas;

(e) burning the dust-formed soot thus conditioned in a pulverized fuel burner allowing for a maximum grain size of dust particles size of $\leq 140$ $\mu$m at a temperature of 900 to 1000° C. and at an oxygen content above 1%, maintaining a reaction time of at most three seconds, preferably 1 second;

(f) cooling the flue gas formed to 450° C. to 650° C. immediately following the combustion by addition of an or inert gas or water or deducted cooled flue gas; and (g) releasing the heat in the combustion and using it for heating up the inert gas used in the drying process.

The heavy-metal-containing oil is converted in a plant for partial oxidation, termed oil gasification below. Customarily, in a plant for gasifying liquid or solid carbonaceous fuels, only an incomplete conversion of the carbon compounds takes place. This is due to the fact that an oxygen deficit prevails within the flame in which the reaction principally takes place. This oxygen deficit results from two causes: firstly, the partial oxidation requires considerably less oxygen than combustion, therefore oxygen is added relatively sparsely. Secondly, an approximately perfect mixing of oxygen with oil mist is technically very difficult to achieve, so that within the reaction zone, areas having a relatively large oxygen deficit coexist together with areas well supplied with oxygen. The poorer the mixing, the more soot is formed. In a development of the present invention, the three- or multistream burner achieves the object of ensuring particularly good mixing and distribution of fuel and oxidizing agent.

A customary technique of disposing of soot is to recycle it to the gasification reactor. In this recirculation, a majority of the recirculated soot is converted into synthesis gas. Direct recirculation of heavy-metal-containing soot from an oil gasifier into the gasification reactor would lead to an enrichment of the heavy metals in the gasification reactor and in the subsequent apparatuses, and as a result would lead to the operating problems mentioned above. Therefore, the heavy metals must be separated off from the soot in a complex manner before recirculation of the soot to the gasification reactor is technically expedient. This is customarily achieved in an extraction unit in which naphtha serves as extraction medium. Since such a separation never succeeds perfectly at acceptable cost, heavy metal enrichment in the gasification reactor and downstream devices must always be expected.

In another process, described in laid-open application DE-43 09 825, the filter cake is treated with acid. The acid here dissolves the heavy metals from the soot.

A further feature of the present invention is that the soot formed in partial oxidation which comprises the heavy metals in adsorbed chemical compounds is scrubbed out of the resulting synthesis gas by means of an aqueous scrubbing solution.

From GB-A-1 178 267 the technology of the a of soot is known, wherein the soot-water suspension of a further treatment is undertaken.

The present invention therefore avoids the complex separation of the heavy metals from the soot, which is advantageously accompanied by considerable savings in the equipment requirements and an increase in the operational reliability. It is desired here to obtain soot having as high a content of heavy metals as possible, since the heavy metals support the combustion process and are separated off on a filter after the soot combustion. Only apparatuses with which no operational problems are expected are provided. A separation process for soot and heavy metals can therefore be omitted; the separate combustion replaces the separation process.

It initially appears a disadvantage that the energy present in the soot is not produced in the form of synthesis gas. If the soot were recycled to the gasifier, the carbon would be converted to synthesis gas. Surprisingly, the conversion of oil to synthesis gas in a three- or multistream burner succeeds so well that only very little soot is formed. This correspondingly has a high heavy metal content, which fits in with later metal recovery by combustion and is another advantage. Because of the very high yield of a three- or multistream burner, the loss in synthesis gas yield is extremely low in comparison with the customary technology using complete soot recirculation, so that soot recirculation even from the energetic point of view would no longer be worthwhile.

Therefore, special developments of the present invention have been created in which heavy-metal-containing oil is fed to a partial oxidation stage, which is preferably equipped with a three- or multistream burner, which achieves a high conversion of carbon to synthesis gas and generates correspondingly little soot.

In contrast, it is possible to remove more usable heat from the synthesis gas, since accumulation of heavy metals due to soot recirculation no longer occurs, and as a result it becomes possible to use heat exchangers for the waste-heat utilization at a higher temperature without the risk of exposing them to the risk of clumping and corrosive attack. The overall efficiency of a combined cycle gas turbine power station with integrated gasification for producing electrical energy from synthesis gas can thus be improved, for example, by up to 5 percentage points, which is a further advantage of the invention.

The soot, which essentially comprises the unreacted carbon, is discharged in dust form from the gasification reactor and comprises heavy metal compounds in solid form. In a subsequent water scrubbing, which can be connected downstream of the waste-heat utilization, the soot is separated from the process gas. It is present thereafter as a 1% strength aqueous suspension, termed "soot water" below. The heavy metal compounds are present in the soot water both in dissolved form and in solid form bound to the soot particles.

After a pressure reduction of the soot water and, if appropriate, steam stripping, the heavy-metal-containing soot is filtered off from the soot water using a filter press. The filter cake has a soot content of 15–25%, the remainder is water. In the customary prior art, at this point the heavy metals must be extracted from the soot, with the heavy metals passing into a wastewater solution, which must be given a complex aftertreatment to allow it to be disposed of.

During the filtration in the chamber filter press, it is apparent, moreover, that at the beginning of the filtration operation a filtrate is produced which still has a significant heavy metal content, whereas the heavy metal loading of the filtrate, after a sufficiently thick filter cake has developed, falls sharply and decreases to very low concentrations. Only the part of the filtrate which is pressed through an adequately thick filter cake layer complies with the conditions for discharge as wastewater. Owing to the fact that heavy metals are retained in the filter cake during the filtration operation by a minimum thickness of the filter cake, the filter cake is not low in heavy metals either, which is otherwise wanted. Therefore, according to the prior art, additional measures for removal of heavy metals either from the filtrate and/or from the filter cake have to be taken.

In the present invention, removal of the heavy metals from the filter cake is not desired, since the filter cake is to be further processed for recovery of the metals. Following the above-mentioned laid-open application DE-43 09 825, the filtrate, from the start of filtration, is therefore collected in a vessel until the heavy metal concentration of the instantaneous filtrate flow is below the statutory limits for wastewater. From the vessel, the heavy-metal-containing filtered water is then again gradually co-filtered in the same chamber filter press, the filter cake already formed being used as heavy-metal-adsorbing layer. The filtrate then flowing off is no longer passed into the vessel. It is so low in heavy metals that both the statutory provisions for the discharge of wastewater can be complied with and no significant losses of valuable heavy metals have to be tolerated, which are both advantages of the invention. The resulting filter cake comprises the heavy metals virtually completely.

In departure from patent DE-43 09 825, this filter cake is not freed from its heavy metals, however, and it is not provided to recycle the soot to the gasifier.

Therefore, in a further development of the present invention, the filter cake thus produced which comprises virtually all the heavy metals is dried to a residual moisture of <10% either in a spray-drier, a pneumatic drier equipped with a grinder or a mill-drier by heated inert gas.

During the drying according to the invention of the filter cake to a water content of <10%, care must be taken to ensure that an explosive mixture does not form. Drying is therefore expediently performed under an inert atmosphere. It has been found that in the case of gasification plants which are operated with oxygen-enriched air or oxygen, sufficient excess nitrogen from an air fractionation plant is available, which cannot be used in other ways and can therefore advantageously be used as a drying medium. Drying with the use of this nitrogen in a single pass saves complex and expensive cooling and condensation apparatuses as well as circulation devices, as are required in gas recirculation.

The drying itself is preferably performed in systems in which the fine particle size spectrum necessary for the subsequent combustion is produced directly during the drying. Suitable equipment for this purpose are, for example, mill driers, pneumatic driers equipped with a grinder and sifter or spray driers, the drying gas, e.g. the above-mentioned nitrogen, being heated by the flue gas waste heat which is formed in the subsequent soot combustion.

Therefore, a further development of the present invention is created in which the dust-free soot thus conditioned is burnt in a pulverized-fuel burner at a temperature of 900 to 1000° C. and at an oxygen content above 1% while maintaining a reaction time of at most 3 seconds, preferably 1 second.

In order to be able to carry out the pulverized-fuel combustion in the manner described below, the dried soot may have a sieving residue of at most 10% by weight on a 90 Tm sieve, and soot particles greater than 140 Tm must not be present. This means that 90% by weight of the soot must consist of particles smaller than 90 Tm. In the commercial mill-drier and pneumatic drier systems, this can be achieved by the prior art in a simple manner. Surprisingly, it has also been found that the necessary particle fineness can also be achieved using a spray drier. For this purpose, a defined amount of water must be admixed to the dewatered 20% by weight dry matter becomes just pumpable. The shear forces occurring on atomization are adequate to divide the soot into particle size fractions as specified. The choice between the use of a mill-drier, a pneumatic drier or a spray drier is made in accordance with the respective site conditions.

The combustion is carried out in a pulverized-fuel burner or a pulverized-fuel chamber at a combustion temperature between 900 and 1000° C., an oxygen partial pressure above 0.01 bar and a residence time of at most 3 seconds, preferably 1 second.

The combustion of soot residues has already been extensively described in the patent literature in publications EP-0 686 582, DE-40 03 242, EP-0 542 322.

Laid-open application EP-0 542 322 likewise deals with a process in which vanadium-containing soot is burnt to produce a vanadium-containing solids mixture. However, the combustion must be performed below 700° C. or the oxygen partial pressure must be below 0.01 bar; in this manner the production of interfering amounts of vanadium pentoxide is avoided. The combustion is not performed in these cases in a pulverized-fuel burner, but either in a multiple-hearth furnace or rotary kiln or fluidized-bed furnace. The residence times of the soot in this case are, due to the type of construction, considerably longer than in a pulverized-fuel combustion chamber; this has the disadvantage of considerably greater dimensions and therefore necessitates greater capital expenditure. Furthermore, the lower oxygen partial pressure leads to an incomplete carbon conversion, for which reason recirculation of the ash produced in the furnace is necessary, which is a further disadvantage, on account of the associated complexity. Furthermore, the addition of fluxes to the furnace appears to be necessary for expedient further processing, which increases the energy consumption and is a further disadvantage. During the necessary predrying, interfering dust formation must obviously be avoided, which, on account of the additional measures to be taken, which can even include the use of two different furnaces connected in series, and in addition because of the restrictions to be complied with in the choice of the drying temperature, is a further disadvantage.

Laid-open application DE 40 03 242 presents a process which mixes the heavy-metal-containing soot from a synthesis gas generation plant, prior to its filtration, with sewage sludge. The filter cake which is formed in a subsequent filtration is burnt as far as possible without the use of auxiliary fuel; in one of the examples, the publication mentions combustion in a fluidized bed. However, it remains unclear how in a joint combustion of vanadium-containing soot and sewage sludge the formation of vanadium pentoxide can be prevented, in particular taking into account the statutorily prescribed minimum oxygen content of 6% based on dry flue gas and the long residence times in the furnace due to the type of construction. There is thus a trend toward the risk of clumping and corrosion, which may not occur until long-term operation and are not observable with the small experimental amounts such as are specified in the publication. This is a considerable disadvantage. Furthermore, the resulting ash is to be deposited in a "sanitary landfill". Although the sanitary landfill is always preferable to non-sanitary disposal methods, sacrificing the isolation of the heavy metals present in the soot is a further considerable disadvantage in comparison with the present invention.

Laid-open application EP-0 686 598 describes a process for combined fluidized-bed drying with subsequent combustion. In this case, vanadium-containing soot from a plant for partial oxidation is to be "burnt" between 600 and 1000° C., and the formation of vanadium pentoxide is suppressed by decreasing the oxygen partial pressure to $10^{-7}$ to $10^{-8}$ bar, as a result of which the conditions of partial oxidation are virtually present. This is also confirmed by the fact that the vanadium-containing ash originating from this process is said still to have a carbon content of 2 to 5%. The combustion process itself is restricted to soot which comprises at least 60% carbon. The publication describes how steam is generated from the gas at 850° C. after the combustion. It is stated here that the wall temperature of the boiler was selected to be below 300° C., to prevent clumping. The walls of the combustion chamber were also cooled to below 300° C. by placing an air curtain between the actual combustion space and the combustion chamber wall. It is a disadvantage that this is obviously in contradiction to the statement that the formation of vanadium pentoxide is effectively suppressed, if it is considered that the risk of clumping described in the literature is essentially due to the vanadium pentoxide formation. If vanadium pentoxide really is not formed, the described complexity in this manner is not necessary. At another place in the publication, a statement on the gaseous emissions is made. The oxygen content is stated herein at 13.89%; under atmospheric conditions, this is an oxygen partial pressure of 0.14 bar and thus different from the previously specified oxygen partial pressure of $10^{-7}$ to $10^{-8}$ bar by several powers of 10. This means that the actual combustion process is superimposed by addition of considerable amounts of additional air. This would then also explain the fear of clumping on account of vanadium pentoxide formation. Paradoxically, therefore, the air, which is to protect the wall in the combustion chamber against clumping actually leads to precisely the risk of clumping which it is intended to prevent. This risk of clumping therefore also restricts the waste-heat utilization possibilities, which is a serious disadvantage of the described process.

In the present invention, to burn the soot, use is made of a combustion chamber in the manner of the patent DE-41 14 171-C2, which, although it is very similar to that in the laid-open application EP-0 686 598, is operated very differently. This patent DE-41 14 171 C2 describes a combustion chamber in which soot or other combustible substances are conducted on a spiral tangential path, with a particularly good vortexing and mixing being ensured owing to the turbulent flow conditions thus prevailing. However, in a departure from the present invention, the patent DE-41 14 171-C2 communicates a combustion in a temperature range between 1200 and 1300° C., and the sought-after combustion time is also at least 2 s in departure from the present invention, since that patent is targeted toward the combustion of poorly combustible substances.

It is surprising that soot can be burnt at all during such a short reaction period, which is in direct contradiction to the generally recognized inertness of soot. Usually, soot, which comprises virtually no volatile components, in contrast to coal, can be ignited and burnt only with great difficulty. In experiments, it has been found that the reaction constant in the controlled combustion of soot from oil gasification is some powers of ten higher than that for industrially manufactured soot (gas black). obviously, due to the high heavy metal content, an activation takes place, possibly of catalytic nature. In addition there is the fact that the soot particles are smaller than 140 Tm and therefore have a great surface area in relation to their weight. The high reaction rate surprisingly leads to the fact that the problems with clumping which are described in the patent literature for a mode of operation in the specified temperature range and oxygen partial pressure do not occur. This is due to the fact that the short time is not sufficient for the formation of vanadium pentoxide, which is considered to be the principal cause of the clumping. In the first phase of the combustion process, the soot particles burn with the formation of carbon monoxide. The carbon monoxide prevents more complete oxidation until the soot particles have burnt away. For this reason, vanadium compounds of lower oxidation states than vanadium pentoxide are also formed until then. These vanadium compounds have significantly higher melting points than vanadium pentoxide and therefore do not lead to clumping at the temperatures present in the combustion system. As soon as the soot particles have burnt away, there is the risk of the formation of vanadium pentoxide. Therefore, further reaction must be prevented at this point.

Therefore, as already set forth, the flue gas formed in the combustion is immediately cooled to 450 to 650° C., preferably 600° C., following the combustion by addition of air or inert gas or water or dedusted cooled flue gas.

This can be achieved by adding to the combustion chamber, through lateral orifices, colder gas or atomized liquid which, owing to the good distribution due to the type of construction, mixes very rapidly with the hot exhaust gas. As gas, use can be made of cold air, cold inert gas or cold cleaned-up flue gas. Adding the cold gas or the liquid is also possible immediately downstream of the combustion chamber, if it can be ensured that mixing is so good that quasi-instantaneous cooling takes place. The temperature is to be set by this addition to 450° C. to 650° C., preferably to 600° C., immediately downstream of the combustion process. Subsequently thereto, the heat present in the flue gas is utilized to heat up the drying gas.

Thus another development of the present invention is provided, in which the heat released in the combustion is used to heat up the inert gas employed in the drying process. As a result, the chemical energy present in the soot is utilized in an advantageous manner, that is to say to save primary energy.

Owing to these measures, the combustion reaction is virtually frozen and higher oxidation of the vanadium compounds to vanadium pentoxide ceases, in addition, this enables the combustion chamber to be able to be built in a compact form and thus fabricated correspondingly less expensively, which is a further advantage of the invention.

In a further development of the present invention, it is provided that the ash remaining after the combustion of the soot and dedusting of the flue gas is supplied as a metallurgical raw material to the isolation of vanadium and other heavy metals present in the oil, the ash predominantly comprising the vanadium in compounds whose oxidation states lie below that of vanadium pentoxide.

The ash which is formed in the combustion of the soot is, after the waste-heat utilization, separated off from the exhaust gas by a filter and removed dry. It comprises the heavy metals in concentrated form, the majority of the vanadium being present as vanadium dioxide. The carbon content of the ash is extremely low, since the described reaction procedure achieves a virtually complete combustion. The ash may be utilized directly metallurgically.

The dedusted flue gas is fed according to the invention into a suitable plant for further purification to remove the remaining pollutants.

FIG. 1 shows a process flow chart, in which the process according to the invention is described by way of example.

The heavy-metal-containing oil is converted by partial oxidation in an oil gasifier. For this purpose, heavy-metal-containing oil 3 is injected into the oil gasifier 1 by a three-stream burner and finely atomized to form a fine oil mist by the two oxygen streams 2 and 4. At a high pressure up to about 90 bar, and a temperature of approximately 1400° C., partial oxidation takes place, in which more than 99% of the heavy-metal-containing oil 3 is converted to synthesis gas and less than 1% to soot, to which the heavy metal compounds adsorb. The crude synthesis gas 5 formed is passed to a crude gas cooler equipped with waste-heat utilization 6, which cools the synthesis gas to 300 to 400° C. The cooled crude gas 7 is passed thereafter to a water quench 8 where the soot, together with other soluble substances, is scrubbed out with water 9. The prepurified synthesis gas 10 is given off for further use. The hot soot water 11 is expanded to atmospheric pressure and cooled in a soot water flash 12. In the course of this, the flash gas 13, which comprises the gases which are less soluble in water at lower pressure, escapes. The cold soot water 14 is passed to a filter press 15 and filtered. The heavy-metal-containing filtrate 17 first obtained is branched off and stored temporarily in an intermediate filtrate vessel 18. As soon as the heavy metal concentration of the filtrate stream from the filter press 15 has fallen below a value which permits disposal as wastewater, the clean filtrate 16 is discharged. The temporarily stored filtrate 19 is gradually recirculated to the filter press 15 and filtered again. In the course of this, the heavy metals are taken up by the filter cake already formed. After the end of the filtration operation, the filter cake 20 is passed into the drier 21 and dried by hot inert gas 22. In the drier 21, in addition, the soot particles are comminuted to particle sizes below 140 Tm. In addition, the drier contains a soot filter which prevents the moist inert gas 23 entraining soot particles on leaving the drier 21. The moist inert gas 23 can be discharged to atmosphere, since it scarcely contains impurities. The dried soot is pneumatically transported as soot dust 24 to the soot burner 25, where it is completely burnt with burner air 26 in a very short time at 900 to 1000° C. Immediately after this combustion process, the hot flue gas passes through a zone in which it is abruptly cooled to below 650° C. This cooling is performed in a mixing chamber 27 in which cold gas 28 is intensively mixed with the flue gas of the soot burner 25. The mixing chamber 27 and the soot burner 25 can be designed as a combustion chamber as a structural unit. The flue gas 29 between 650 and 450° C. gives up its thermal energy in the flue gas/inert gas heat exchanger 30 to the cold inert gas 31. The cold flue gas 32 is freed from the heavy metal ash 34 in the gas filter 33 and is discharged as dedusted flue gas 35 to a suitable plant for further clean up. The heavy metal ash 34 has no significant soot content and is therefore utilized as a metallurgical raw material.

What is claimed is:

1. A process for generating a metallurgical raw material from heavy metal containing oil, which is fed to a partial oxidation, said process comprising the features of:

(a) scrubbing out from a synthesis gas formed in the partial oxidation by means of an aqueous scrubbing solution a soot formed in the partial oxidation which comprises the heavy metals in adsorbed chemical compounds;

(b) filtering the scrubbing solution in a chamber filter press in such a manner that the filtrate obtained initially is collected and filtered again to produce a filter cake which comprises the heavy metals;

(c) drying the filter cake to a residual moisture of less than 10% in a spray drier, a pneumatic dryer or a mill drier by heated inert gas;

(d) burning a dust-free soot thus conditioned in a pulverized fuel burner allowing for a maximum grain size of dust particles of 140 $\mu$m at a temperature of 900 to 1000° C. and at an oxygen content above 1%, maintaining a reaction time of at most three seconds;

(e) cooling a flue gas formed during the burning step (d) to 450° C. to 650° C. immediately following the burning step (d) by addition of an inert gas or water or deducted cooled flue gas;

(f) releasing the heat in the burning step (d) and using it for heating up the inert gas used in the drying process; and (g) separating off the heavy metals produced as ash by the burning step (d) from the cooled flue gas.

2. The process as claimed in claim 1, wherein the filter cake which comprises the heavy metals is dried to a residual moisture of <10% in a spray drier equipped with a grinder or a mill drier by heated inert gas.

3. The process as claimed in claim 2, wherein the flue gas formed during the burning step (d) is cooled to 450 to 650° C. immediately following the the burning step (d) by addition of air or inert gas or water or deducted cooled flue gas.

* * * * *